(12) United States Patent
Spencer

(10) Patent No.: US 6,712,277 B2
(45) Date of Patent: Mar. 30, 2004

(54) MULTIPLE INTERFACE MEMORY CARD

(75) Inventor: Andrew M. Spencer, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 10/002,210

(22) Filed: Dec. 5, 2001

(65) Prior Publication Data

US 2003/0102380 A1 Jun. 5, 2003

(51) Int. Cl.[7] .............................................. G06K 19/06
(52) U.S. Cl. ...................... 235/492; 235/487; 235/441; 361/737; 710/2; 710/300; 710/306
(58) Field of Search ................. 235/492, 487, 235/441; 361/737; 710/2, 300, 306

(56) References Cited

U.S. PATENT DOCUMENTS

| | | | |
|---|---|---|---|
| 5,345,231 A | | 9/1994 | Koo et al. ............. 340/870.31 |
| 5,657,028 A | * | 8/1997 | Sanad ................. 343/700 MS |
| 5,929,815 A | * | 7/1999 | Elderfield ................... 343/702 |
| 6,219,732 B1 | * | 4/2001 | Henrie et al. ............... 710/301 |
| 6,295,031 B1 | * | 9/2001 | Wallace et al. ............. 343/702 |
| 6,377,218 B1 | * | 4/2002 | Nelson et al. .............. 343/702 |
| 6,404,393 B1 | * | 6/2002 | Nelson et al. .............. 343/702 |

FOREIGN PATENT DOCUMENTS

EP  0 473 569  3/1992

OTHER PUBLICATIONS

Lexar Media, Website, Oct. 12, 2001 <http://www.lexarmedia.com/>.

* cited by examiner

*Primary Examiner*—Thien M. Le
*Assistant Examiner*—Daniel Hess

(57) ABSTRACT

A memory card and a method for operating a memory card, the memory card comprising: a memory mass storage; a first data interface with a contacting interface and a high data transfer rate; a second data interface with a contact-less interface. In a preferred embodiment, a memory card controller is included for selecting a first data line from said first data interface or a second data line from said second data interface to communicate with said memory mass storage based on a criteria.

3 Claims, 2 Drawing Sheets

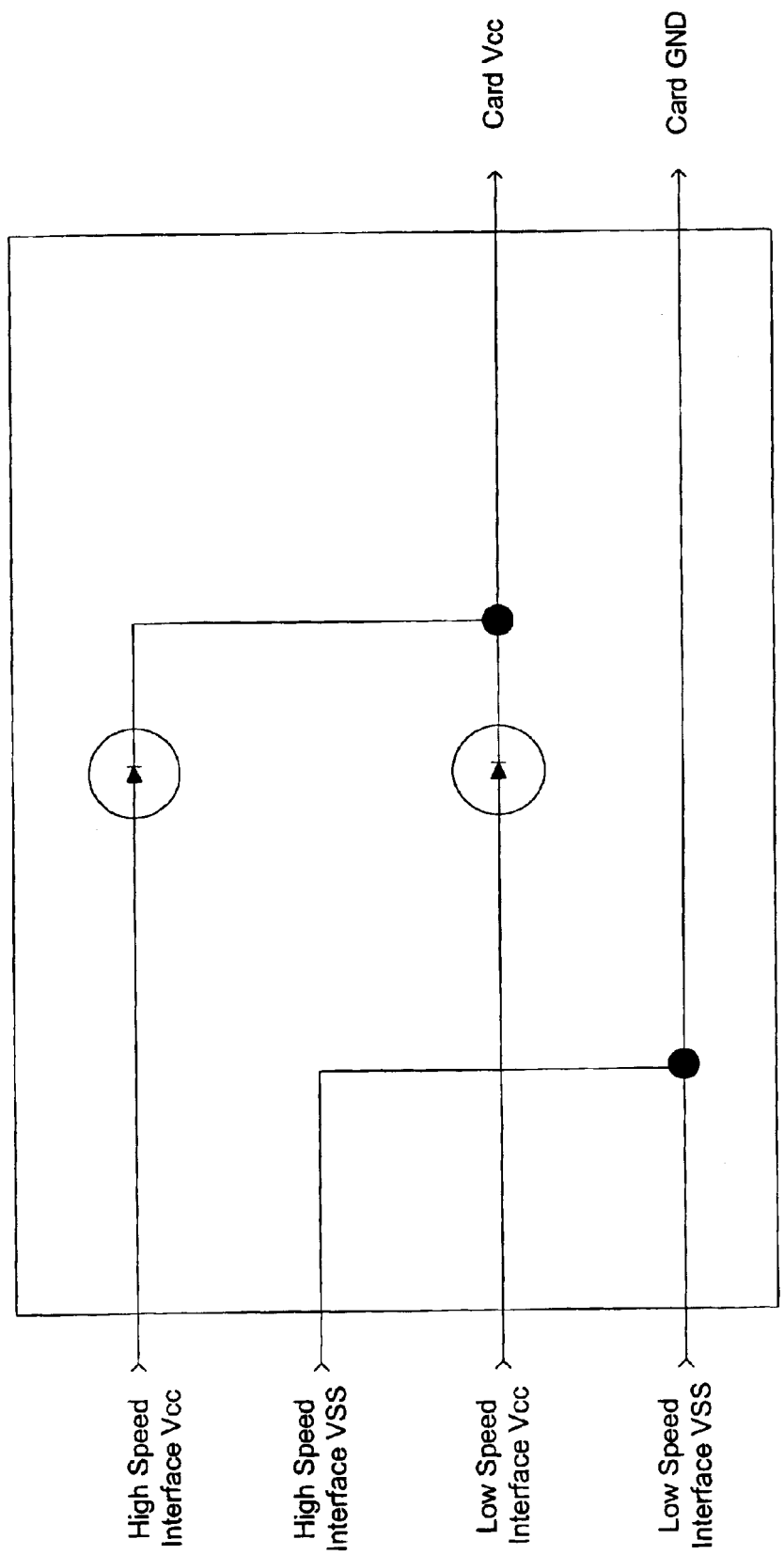

MULTIPLE INTERFACE MEMORY CARD

FIELD OF THE INVENTION

The present invention relates generally to memory cards, and more particularly, to multiple interface memory cards.

BACKGROUND OF THE INVENTION

Memory cards have found wide application in the electronics and consumer appliance industries. It has been recognized that different electronic applications have different memory access speed requirements. Certain applications such as cameras and PDAs require a high data rate. In contrast, certain other applications are operable with much lower data rates and need a contact-less interface. The present invention is directed to solving this problem of multiple memory access speed requirements.

SUMMARY OF THE INVENTION

Briefly, the present invention comprises in a preferred embodiment, a memory card, including: a memory mass storage; a first data interface with a contacting interface and a high data transfer rate; and a second data interface (40) with a contact-less interface.

In a further aspect of the present invention, a memory card controller is provided for selecting a first data line from said first data interface or a second data line from said second data interface to communicate with said memory mass storage based on a criteria.

In a further aspect of the present invention, the criteria is a predetermined card select detect signal from said first interface.

In a yet further aspect of the present invention, the criteria is a detecting an indication of a carrier detect signal from said second data interface.

In a further aspect of the present invention, the first interface is a contacting interface for one of the following applications: a secure digital application, multimedia card, compact flash, memory stick, or a PCMCIA.

In a further embodiment of the present invention, a method of operating a memory card is provided comprising the steps of: monitoring for a predetermined signal, and switching an input to a memory mass storage from a cable data interface to a contactless data interface upon detection of the predetermined signal.

In a further aspect of the present invention, the monitoring and switching steps are performed automatically at power-up.

BRIEF DESCRIPTION OF THE DRAWINGS

FIG. 2 is a schematic diagram of a power routing block that may be used to implement a preferred embodiment of the present invention.

DETAILED DESCRIPTION OF THE PREFERRED EMBODIMENT

Figure 1:
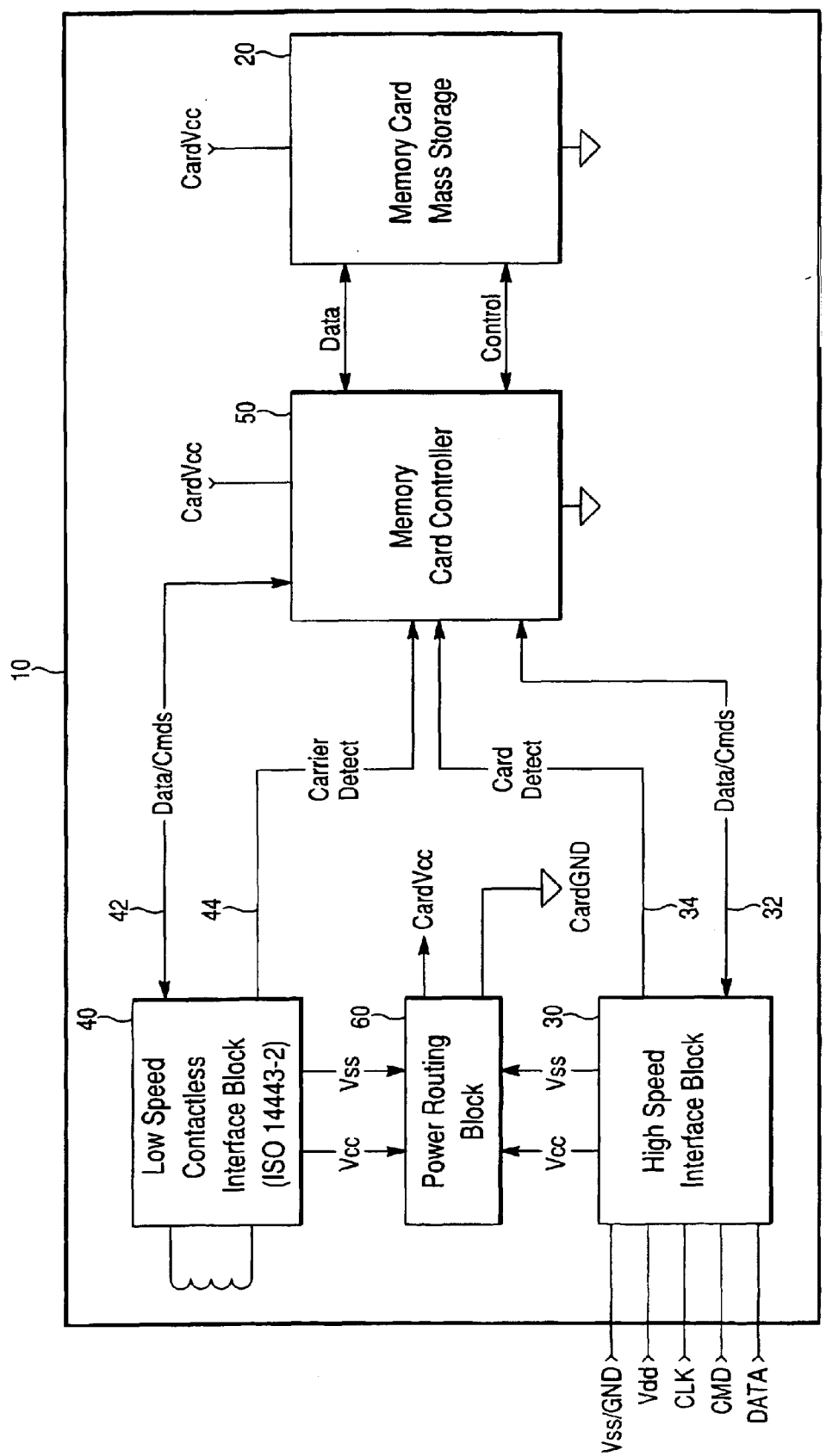
FIG. 1 is a schematic block diagram of a preferred embodiment of the present invention.

Referring now to the FIG. 1, there is shown a preferred embodiment of a memory card 10 in accordance with the present invention. The memory card 10 comprises a memory mass storage 20, a first data interface block 30 with a high data transfer rate and a contacting interface, and a second data interface block 40 with a contact-less interface.

The memory mass storage 20 may take a wide variety of implementations, including flash memory, ROM, disk, OTP, or any other memory technology.

The first data interface 30 may be implemented in a variety of configurations. In a preferred embodiment, the first data interface 20 is implemented with an high data rate interface block. Examples in the market today include the Compact Flash, Secure Digital, MulitMediaCard and Memory Stick interfaces. Standard input lines for such a high data rate interface block are shown. Such lines would include a ground line or lines (Vss/GND), a supply voltage line or lines(Vdd), a clock line (Clock), a command line or lines (Command) and a data line or lines (Data). This type of high speed data rate interface is particularly useful for cameras and PDAs. In order to achieve high data rates, a contacting interface is needed so that the transfer of data between the host device and the memory card can meet the clocking requirements of a high speed interface and not bear the burden of a carrier and encoding that the contact-less interface requires The second data interface 40 may take a variety of configurations also. The second data interface may simply comprise an contact-less interface, which, because it is contact-less, has a much slower data transfer rate. However, in a preferred embodiment, a magnetically coupled interface is provided for use with low speed transfers. By way of example but not by way of limitation, this second data interface 40 may be implemented by an RF Powered/Signal Interface Block. This interface would receive signals through magnetic coupled fields, as is well known in the art (such as ISO standard ISO 14443-2).

A standard power routing block 60 could be connected to both of the first interface 30 and the second interface 40 in order to provide necessary power routing. At the application of power, the power routing block routes the power from the interface block that has been energized to the remainder of the circuitry. FIG. 2 shows this block as a simple diode structure but it could be a more complicated structure.

In one embodiment of the present invention, the data and commands from the high speed first data interface 30 could be provided directly to the memory card mass storage 20 to a dedicated portion thereof. Likewise, the data and commands from the second data interface 40 could be provided to a different dedicated portion of the memory card mass storage 20.

In a preferred embodiment of the present invention, a memory card controller 50 is utilized to route data from one or the other of the first data interface 30 or the second data interface 40 to the memory card mass storage 20. The memory card controller 50 operates to determine which of the first data interface 30 or the second data interface 40 is active, and then routes the written and read data from the active data interface to the memory card mass storage 20. In a preferred embodiment, this determination could be performed at power-up. The determination of which interface is active could be accomplished, by way of example, by detecting a card select detect 34 or other signal that the high speed data access interface block asserts when it has been powered up and selected by the host. Alternatively or in addition, the memory card controller 50 could detect the assertion of the carrier detect line 44 from the second data interface 40. This line is asserted when the carrier signal applied to the card is detected by the RF Powered/Signal Interface Block. Typically, this carrier will be a 13.96 Megahertz carrier, if the ISO 14443-2 standard is utilized. Accordingly, if the assertion of the card select detect signal is detected on line 34, then data and commands on line 32 are routed from the first data interface 30 through the memory card controller 50 to the memory card mass storage 20. Alternatively, if a carrier detect signal is detected on line 44 by the memory card controller, then data and/or commands on line 42 from the second data interface 40 are routed through the memory card controller 50 to the memory card mass storage 20.

Note that the system could be configured to normally connect one of the data interfaces to the memory mass storage, with a switching occurring to the data line of the other interface only if an appropriate signal or other criteria are met. For example, the memory card controller 50 could be set to normally connect the data line 42 for the wireless interface 40 to the memory card mass storage 20, but would be switched to connect the data line 32 of the cable interface 30 to the memory mass storage 20 if a criteria is met, such as that a card command is received on line 34 indicating that data is being received at the cable interface 30.

Accordingly, it can be seen that a preferred embodiment of the present invention is implemented with a memory mass storage, a cable interface adapted for connection to memory mass storage, and a wireless interface adapted for connection to memory mass storage. If a memory card controller is utilized for selecting either the wireless interface or the cable interface, then the selection may be based on a criteria, such as whether a carrier detect signal is detected or whether predetermined card command signals or other signals are detected.

Although the present invention has been disclosed in the context of the use of two interfaces for the memory card, each with a different data transfer rate or speed, the present invention may be implemented with more than two interfaces, each with a different data transfer rate or speed.

Accordingly, it can be seen that a dual or a three or more interface memory card has been disclosed to facilitate the use of a memory card in multiple different applications that require multiple different data transfer speeds. In a preferred embodiment where one of the interfaces is a wireless interface and the other of the interfaces is a cable interface, such a card facilitates use in high data rate applications, as well as providing the ease of convenience of not being required to plug into slots for certain commercial transactions such as e-commerce and banking.

The foregoing description of a preferred embodiment of the invention has been presented for the purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A memory card, comprising:

a memory mass storage;

a first data interface with a contacting interface;

a second data interface with a contact-less interface, the first data interface having a higher data transfer rate than the second data interface; and a memory card controller for selecting a data line from said first data interface or a data line from said second data interface to communicate with said memory mass storage based on a criteria.

2. The memory card as defined in claim 1, wherein said criteria is a predetermined card select detect signal from said first interface.

3. The memory card as defined in claim 1, wherein said criteria is detecting an indication of a carrier detect signal from said second data interface.

* * * * *